S. REED.
Cultivator.
No. 79,001. Patented June 16, 1868.
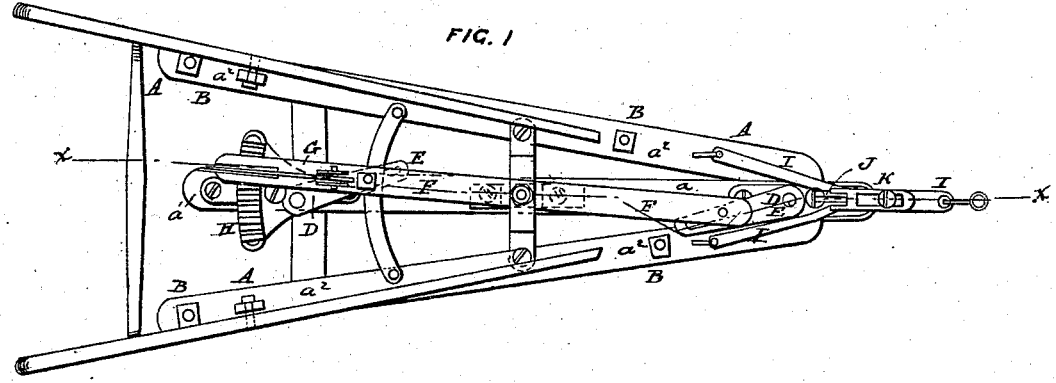
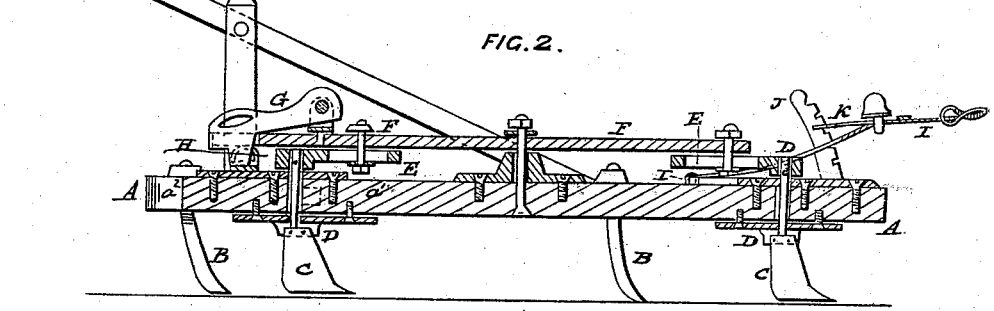
WITNESSES:
W. C. Ashkettle
Wm. A. Morgan
INVENTOR:
Sam'l Reed
by Munn & Co.
Attorneys

United States Patent Office.

SAMUEL REED, OF RISING SUN, MARYLAND.

Letters Patent No. 79,001, dated June 16, 1868.

IMPROVEMENT IN CULTIVATOR.

The Schedule referred to in these Letters Patent and making part of the same.

TO ALL WHOM IT MAY CONCERN:

Be it known that I, SAMUEL REED, of Rising Sun, in the county of Cecil, and State of Maryland, have invented a new and useful Improvement in Cultivators; and I do hereby declare that the following is a full, clear, and exact description thereof, which will enable those skilled in the art to make and use the same, reference being had to the accompanying drawings, forming part of this specification, in which—

Figure 1 is a top or plan view of my improved cultivator.

Figure 2 is a detail sectional view of the same, taken through the line $x\ x$, fig. 1.

Figure 3 is a side view of a modified form of the pointed teeth.

Figure 4 is a side view of a mould-plow, to be attached to the rear ends of the side-bars or beams of the cultivator-frame.

Similar letters of reference indicate corresponding parts.

My invention has for its object to improve the construction of cultivators, so as to make them more convenient and effective in operation; and it consists in the construction, combination, and arrangement of the various parts as hereinafter more fully described.

A is the cultivator-frame, consisting of a central longitudinal bar, $a^1$, and two inclined longitudinal side-bars, $a^2$, connected to each other by cross or brace-bars in the ordinary manner.

B are ordinary cultivator-teeth, attached to the cultivator-frame in the ordinary manner.

C are pointed or rudder-teeth, which may be made either in the form shown in fig. 2, or in that shown in fig. 3.

The upper edges of the pointed teeth C enter slots in the lower ends of the shanks D, where they are detachably secured in place by bolts, pins, or other convenient and removable means.

The shanks D pass through and work in bearings in the central longitudinal bar $a^1$, near its front and rear ends.

To the upper projecting ends of the shanks D are securely attached short levers E, so that the said shanks D, and with them the teeth C, may be turned in one or the other direction.

F is a long lever, the centre of which is pivoted to the longitudinal bar, $a^1$, of the frame A.

The ends of the lever F are pivoted to the free ends of the short levers E by pins or bolts, which pass through the ends of the said lever F, and through slots in the free ends of the levers E, as shown in figs. 1 and 2.

By this construction, by simply moving the long lever F in one or the other direction, the pointed or rudder-teeth C may be inclined to one or the other side, so as to hold the cultivator closer to one or the other of the rows, or to hold it to its place when working upon a side-hill.

To the rear part of the long lever F, or to a short standard attached to said lever, is pivoted the forward end of the lever-catch G, the rear end of which projects downward through a slot in the rear end of the said lever, and takes hold of the teeth of the curved rack H, attached to the rear part of the cultivator-frame A, so as to hold the lever F, and consequently the pointed teeth C, securely in the position to which they have been adjusted.

The lever-catch G serves also as a handle for shifting the position of the long lever F.

I is the draught-bar, to the forward end of which the draught is attached, and the rear end of which is made forked or branched, the ends of the branches being pivoted or otherwise connected to the side-bars, $a^2$, of the frame A.

J is a curved bar, the lower end of which is attached to the forward part of the central bar $a^1$, and which has notches or teeth formed in its forward or convex edge.

K is a slotted slide, which is secured to the draught-bar I by a set-screw, so that, by loosening the said set-screw, the said sliding catch may be moved forward to take hold of the teeth of the curved bar J, or moved back from said bar to allow the draught-bar I to be adjusted.

This construction enables the draught-bar to be conveniently adjusted to cause the cultivator to work deeper or shallower, as may be desired.

When desired, the cultivator-teeth attached to the rear ends of the side-bars, $a^2$, of the frame A may be removed, and replaced by the mould-plows L, which may be so constructed and adjusted as to turn the mould towards or from the rows of plants, as may be desired.

I claim as new, and desire to secure by Letters Patent—

1. The combination of the forked draught-bar I, curved notched bar J, and sliding catch K, or their substantial equivalents, with each other and with the frame A of the cultivator, substantially as herein shown and described, and for the purpose set forth.

2. The pointed or rudder-teeth C, removably attached to the pivoted shanks D, for the purpose of pivoting the said teeth to the frame A, substantially as herein shown and described.

3. The combination of the long lever F, short slotted levers E, pivoted shanks D, and pointed or rudder-teeth C, with each other, and with the cultivator-frame A, substantially as herein shown and described, and for the purpose set forth.

4. The combination of the lever-catch G with the long lever F, and with the curved and notched rack H, attached to the cultivator-frame A, substantially as herein shown and described, and for the purpose set forth.

SAMUEL REED.

Witnesses:
 ISAAC R. TAYLOR,
 SAM'L TOSH.